(12) United States Patent
Jin et al.

(10) Patent No.: US 8,769,573 B2
(45) Date of Patent: Jul. 1, 2014

(54) AUTOMATED QUERY GENERATION FOR TELEVISON CONTENT SEARCHING

(75) Inventors: Zhiying Jin, Lexington, MA (US); Haosheng Guo, Nashua, MA (US); Martin Busse, Woburn, MA (US); Wenjie Liu, Wayland, MA (US); Juhong Liu, Sudbury, MA (US); Jimena Velarde, Arlington, MA (US); Haiyan Zhou, Winchester, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 357 days.

(21) Appl. No.: 12/974,766

(22) Filed: Dec. 21, 2010

(65) Prior Publication Data

US 2012/0159543 A1 Jun. 21, 2012

(51) Int. Cl.
H04N 5/445 (2011.01)
(52) U.S. Cl.
USPC .............................................. 725/39; 725/53
(58) Field of Classification Search
USPC ..................................... 725/39, 53
See application file for complete search history.

(56) References Cited

U.S. PATENT DOCUMENTS

| 7,668,859 B2* | 2/2010 | Streetman ..................... 707/706 |
| 2007/0130139 A1* | 6/2007 | Kim et al. ........................ 707/6 |
| 2008/0126303 A1* | 5/2008 | Park et al. ......................... 707/3 |
| 2009/0055248 A1* | 2/2009 | Wolf ............................... 705/10 |
| 2011/0289530 A1* | 11/2011 | Dureau et al. .................. 725/38 |

* cited by examiner

Primary Examiner — Pankaj Kumar
Assistant Examiner — Franklin Andramuno

(57) ABSTRACT

A system is configured to receive a portion of a word; retrieve a group of words matching the portion of the word; retrieve information associated with a set of words in the group, where the information, for a particular one of the words, indicates a measure of popularity of the particular word, geographic location information associated with the particular word, time information associated with the particular word, or user preference information associated with the particular word; rank the set of words based on the information; present a list of words from the set of words for display based on the ranking; receive selection of a word from the list of words; perform a search for television content based on the selected word to identify a group of television content; receive selection of television content from the group of television content; and present the selected television content for display.

24 Claims, 7 Drawing Sheets

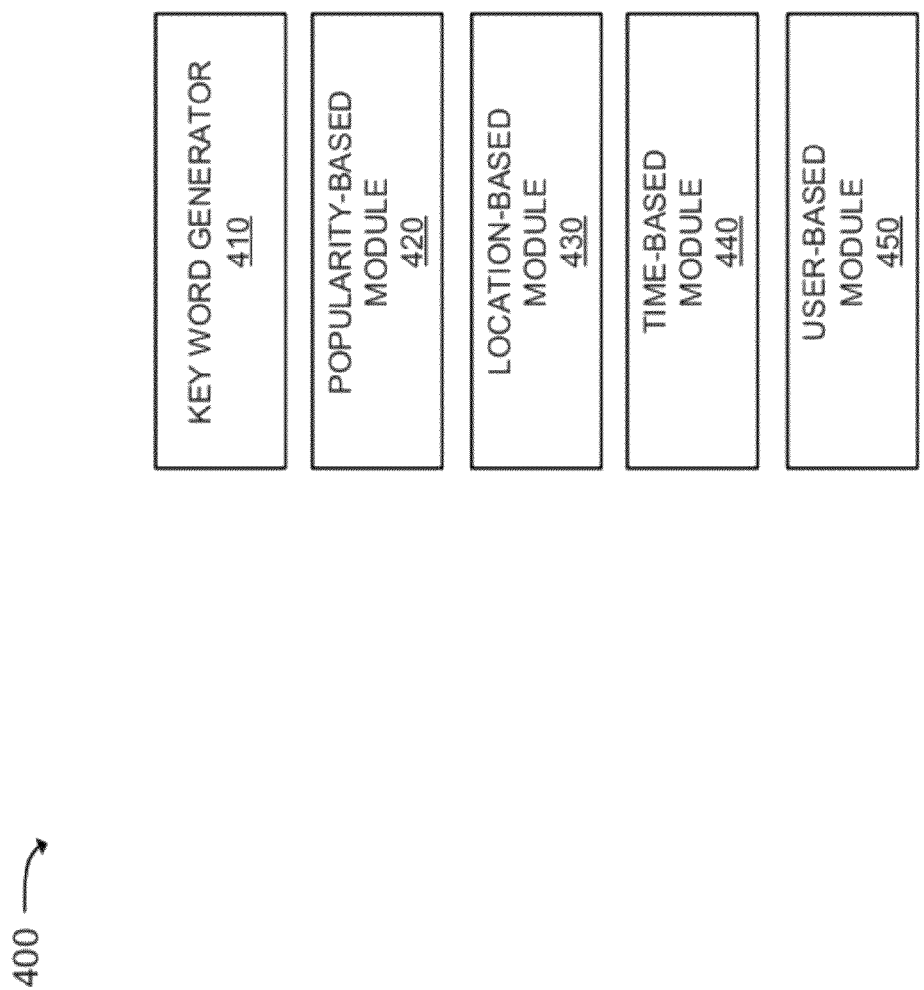

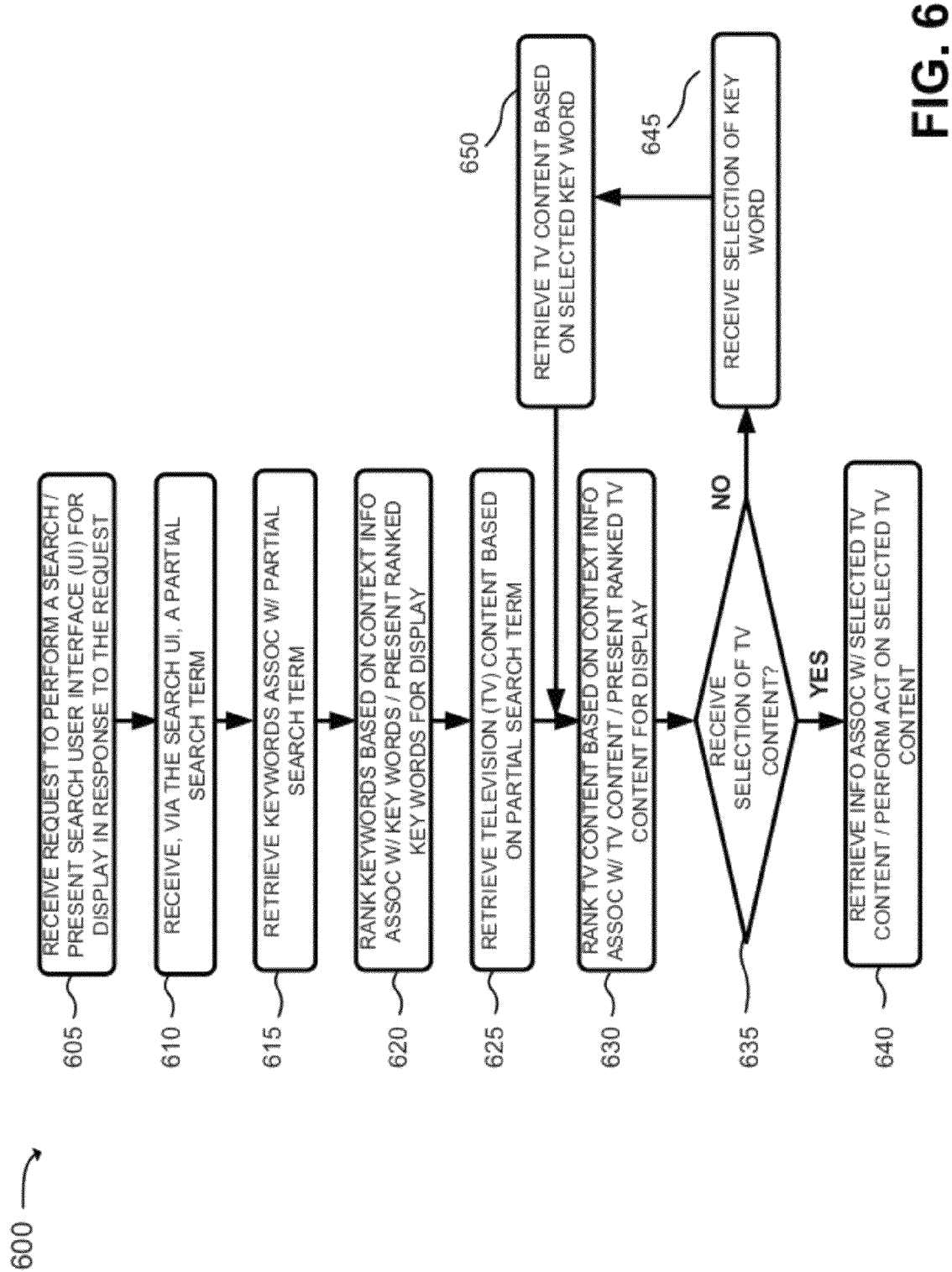

AUTOMATED QUERY GENERATION FOR TELEVISON CONTENT SEARCHING

BACKGROUND

Television content is ever-changing. It seems that new channels, television programs, and/or features intended to enhance the television viewing experience get introduced every day. As a result, it is becoming increasingly difficult for users to wade through all of the content on television.

Television content providers provide tools, such as program guides and searching functionality, that assist users in finding television content in which the users are interested. These tools can be useful if a user knows the name of the television content and/or the date and time at which that television content is broadcast. It is difficult, however, for users to enter search queries that enable the user to select desired television content.

BRIEF DESCRIPTION OF THE DRAWINGS

FIG. 4 is a diagram of example functional components associated with one or more components of FIG. 2;

FIG. 6 is a flowchart of an example process for interacting with and using automated search functions within an example portion of the environment of FIG. 1.

DETAILED DESCRIPTION OF PREFERRED EMBODIMENTS

The following detailed description refers to the accompanying drawings. The same reference numbers in different drawings may identify the same or similar elements. Also, the following detailed description does not limit the embodiments.

Systems and/or methods, described herein, may provide an automatic search query generation application (hereinafter referred to as a "search application") that enables a user to create a query, in a short amount of time, to be used to search for television content based on a partial search term. The terms "television content" and/or "television content data items," as used herein, are to be broadly interpreted to include on-screen television listings (e.g., a list of scheduled television programs, the channels where the television programs may be displayed, and/or the corresponding broadcast time for each television program, etc.), DVR programming schedules, on demand service listings (e.g., video, games, music, etc.), favorites listings, music listings, game listings, bookmarked items listings, program description pages and/or television channels.

The search application, as described herein, may enable the user to enter, via an automatic search user interface (UI), a partial search term in order to perform a search operation. The term, "partial search term" or "portion of a key word," as used herein, may include fewer than all of the characters of a key word and/or search term as intended by the user of the user device. The partial search term and/or the portion of the key word may correspond to subject matter, a title, and/or other information associated with television content on which the user desires to perform an operation (e.g., to view, play, record, save, etc.).

The search application may use the partial search term to identify a list of key words from which the user may select a key word to be included in a search query. The list of key words may be ranked and/or displayed based on popularity, relevance to a location associated with the user, user habits and/or preferences, relevance with respect to time (e.g., a time of day, a time of year, a season, a holiday, etc.), and/or other factors. The search application may use the search query to retrieve a list of television content from which the user may select particular television content on which to perform an operation (e.g., play, record, save, tune-in, etc.). The list of television content may be ranked and/or displayed based on popularity, relevance to a location associated with the user, user habits and/or preferences, and or relevance with respect to time (e.g., a current time, a time of day, a time of year, a season, a holiday, etc.).

Figure 1:
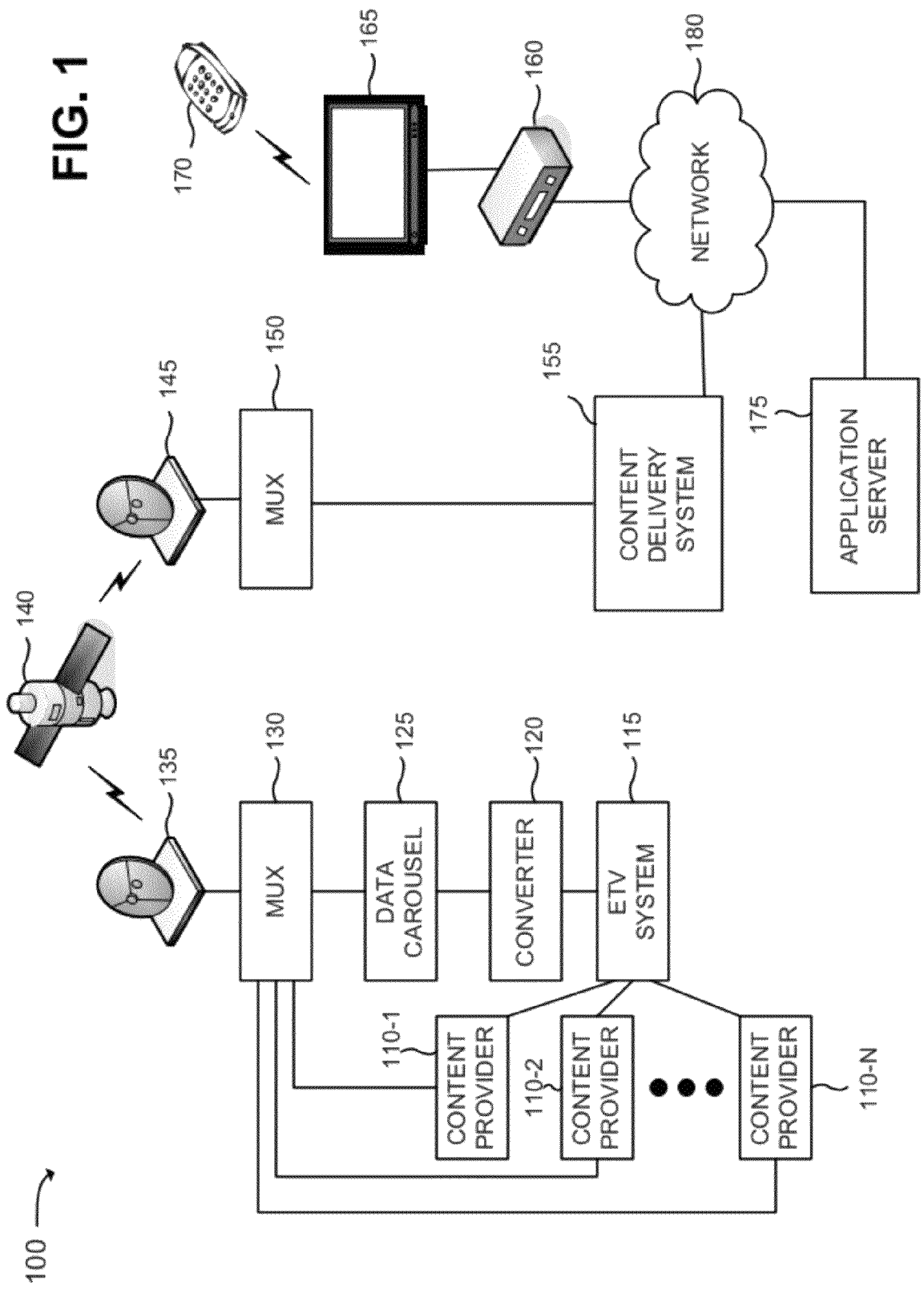
FIG. 1 is a diagram of an example environment in which systems and/or methods, described herein, may be implemented.

FIG. 1 is a diagram of an example environment 100 in which systems and/or methods described herein may be implemented. As shown in FIG. 1, environment 100 may include content providers 110-1, 110-2, ..., 110-N (where N≥1) (collectively referred to as "content providers 110"), Enhanced Television (ETV) system 115, Enhanced TV Binary Interchange Format (EBIF) converter 120, data carousel 125, multiplexer (MUX) 130, satellite uplink 135, satellite 140, satellite downlink 145, MUX 150, content delivery system 155, video client 160, video display device 165, remote control 170, application server 175 and network 180. The number of devices and/or networks, illustrated in FIG. 1, is provided for explanatory purposes only. In practice, there may be additional networks and/or devices, fewer networks and/or devices, different networks and/or devices, or differently arranged networks and/or devices than illustrated in FIG. 1.

Also, in some implementations, one or more of the devices of environment 100 may perform one or more functions described as being performed by another one or more of the devices of environment 100. For example, environment 100 may include a transmission medium that includes devices other than satellites and satellite uplinks and downlinks. In another example, application server 175 and content delivery system 155 may be integrated into a single device. Components of environment 100 may interconnect via wired connections, wireless connections, or a combination of wired and wireless connections.

Also, two or more of these devices may be implemented within a single device, or a single device may be implemented as multiple, distributed devices. Further, while FIG. 1 shows direct connections between devices, any of these connections can be indirectly made via a network, such as a local area network, a wide area network (e.g., the Internet), a telephone network (e.g., the Public Switched Telephone Network (PSTN) or a cellular network), an ad hoc network, a fiber optic network (e.g., a fiber optic service (FiOS) network), or a combination of networks.

Content providers 110 may include any type or form of content providers. For example, content providers 110 may include free television broadcast providers (e.g., local broadcast providers, such as NBC, CBS, ABC, and/or Fox), for-pay television broadcast providers (e.g., TNT, ESPN, HBO, Cinemax, CNN, etc.), and/or Internet-based content providers (e.g., Hulu, Joost, YouTube, Veoh, Epix, etc.). Content providers 110 may produce media streams (e.g., television broadcasts). A "media stream," as used herein, may refer to stream of content that includes video content, audio content and/or text content.

ETV system 115 may include a device that may work with content providers 110 to generate interactive content for the media streams. ETV system 115 may acquire, decode, and present information, and execute actions contained in an EBIF signal in order to present an interactive multimedia page for display to a user. For example, ETV system 115 may generate interactive content and associated signaling information (e.g., triggers) that are associated with the media streams. EBIF converter 120 may include a device that may process the interactive content and associated signaling information to conform to the EBIF standard. EBIF converter 120 may output EBIF-compliant content and signaling information. Data carousel 125 may include a device that may process the EBIF-compliant content and signaling information to generate multiple data carousels on multiple separate data packet identifiers (PIDs) as part of an MPEG-2 single program transport stream (SPTS). For example, a first PID may contain EBIF-compliant content and a second PID may contain the signaling information.

MUX 130 may include a multiplexer device that may receive the media streams from content providers 110 and the EBIF-compliant content and associated signaling information from data carousel 125 and multiplex, or otherwise combine, this data to create an enhanced media stream. Satellite uplink 135 may include a satellite transmitter that may receive the enhanced media stream, process the enhanced media stream for transmission, and transmit the enhanced media stream to satellite 140. Satellite 140 may include a stationary or orbiting communication satellite that may receive the enhanced media stream and relay the enhanced media stream to satellite downlink 145.

Satellite downlink 145 may include a satellite receiver that may receive the enhanced media stream from satellite 140, process the enhanced media stream for transmission, and transmit the enhanced media stream to MUX 150. MUX 150 may include a multiplexer device that may process the enhanced media stream for transmission to content delivery system 155. For example, MUX 150 may include a multiplexer device that may perform some form of modulation on the enhanced media stream, such as quadrature amplitude modulation (QAM).

Content delivery system 155 may include a device, or a collection of devices, that may receive the enhanced media stream and process the enhanced media stream for transmission according a particular protocol, such as the asynchronous serial interface (ASI) format. In another implementation, content delivery system 155 may work with one or more other devices to generate interactive content and associated signaling information and/or to embed interactive content and associated signaling information into a media stream.

Video client 160 may include a device that may receive and process the enhanced media stream from network 180. In one implementation, video client 160 may take the form of a set-top box (STB). In another implementation, video client 160 may include a computer device, a cable card, a communication device (e.g., a telephone, such as a voice over Internet protocol (VoIP) telephone or a mobile telephone, or a personal digital assistant (PDA)), or the like.

Video client 160 may perform decoding and/or decryption functions on the enhanced media stream received from network 180. Video client 160 may also perform functions associated with performing automated search operations and/or processing information associated with displaying television content. Video client 160 may store software associated with a search application, such as information associated with a list of key words and/or context information associated with the list of key words and/or television content. The list of key words may, for example, include key words (e.g., in one or more log files) from which the search application may retrieve a search query (e.g., a key word, a group of key words, a phrase, etc.) to present to a user (e.g., a user of video client 160) in response to a partial search term entered by the user.

The context information may, for example, include information associated with a relative popularity associated with each key word (e.g., within the list of key words) and/or each item of the television content. The search application may, for example, assign a priority (e.g., a higher ranking, a lower ranking, etc.) to each key word and/or item of television content based on a relative popularity associated with each of the key words and/or items of television content. The relative popularity may be associated with information associated with a quantity of times a partial search term has been used, a key word has been selected, television content has been selected, etc. by a user of video client 160 and/or users of other video clients 160. In another example, the context information may include information associated with the user (e.g., username, password, personal identification number (PIN)) and/or information associated with user preferences (e.g., regarding ratings, prices, genre, parental controls, etc.). In still another example, the context information may include information associated with a time, a location, a prior usage by the user, etc.

The search application may, for example, assign a priority to a key word and/or television content based on a geographic location associated with the key word and/or television content relative to a geographic location associated with video client 160. The search application may, in another example, assign a priority to a key word and/or television content based on a time associated with the key word and/or television content relative to a current time (e.g., based on an internal clock or some other clock), a broadcast time associated with television content, a season, a time of year, a time of day, a time associated with a holiday, etc. The search application may, in another example, assign a priority to a key word and/or television content based on a prior usage by the user. The prior usage by the user may correspond to a quantity of times that the user has used the key word to perform a search for television content and/or a quantity of times that the user has selected and/or performed an operation on television content.

Video client 160 may update the one or more log files (e.g., that store the list of key words) when new key words are used by the user and/or other users. Video client 160 may update the context information based on changes in user habits, as key words increase or decrease in relative popularity, as seasons and/or time changes, etc.

Video client 160 may also receive, decode, and store information and updates associated with television content in the memory of video client 160. Video client 160 may retrieve stored television content and may process and/or present television content to video display device 165 for display. Video client 160 may perform other functions, such as DVR functions, relating to the storage and playback of video content. Video client 160 may further perform Internet-based content retrieval functions, such as searching and/or retrieving web pages or other Internet-based content.

Video display device 165 may include any device capable of receiving and/or reproducing video and/or audio signals. In one implementation, video display device 165 may take the form of a television. In another implementation, video display device 165 may include a computer monitor, a display of a communication device (e.g., a telephone, such as a VoIP telephone or a mobile telephone, or a PDA), or the like. Video display device 165 may be connected to video client 160 and may receive signals from video client for purposes of displaying television content, searching for television content, etc.

Remote control 170 may include any device capable of remotely controlling the operation of video client 160 and/or video display device 165. Remote control 170 may take the form of a remote control device similar to a television or STB remote control device, a game controller, a keyboard, a keypad, a PDA, a mobile telephone, or the like. Remote control 170 may provide commands to video client 160 and/or video display device 165 by transmitting signals, such as wireless signals (e.g., infrared or Bluetooth) or signals transmitted over wires (e.g., over a universal serial bus (USB) interface or the like), to a reader associated with video client 160 and/or video display device 170.

Application server 175 may include one or more server devices, or other types of computation or communication devices, that gather, process, search, store, and/or provide information in a manner similar to that described herein. Application server 175 may communicate via network 180. Application server 175 may store context information and/or information associated with a list of key words. Application server 175 may, for example, communicate with other video clients 160 to monitor popularity associated with key words and/or whether new key words are used. Application server 175 may, in another example, communicate with the other video clients 160 to monitor popularity associated with television content (e.g., broadcast television content, pay per view, VoD assets, games, etc.). Application server 175 may update a list of key words and/or context information based on the monitoring. In another example, application server 175 may communicate with other server devices that host websites (e.g., on the Internet) that may identify a relative popularity associated with television content and/or key words. The application server 175 may, for example, update the list of key words and/or the context information based on the communication with the other server devices. Application server 175 may send updates to the list of key words and/or context information to video client 160.

Network 180 may include a single network or multiple networks. For example, network 180 may include a video signaling and distribution network, such as a fiber optic-based network (e.g., a fiber optic service network), that distributes information and/or television content from content delivery system 155. Additionally, or alternatively, network 180 may include one or more wired and/or wireless networks. For example, network 180 may include a cellular network, the Public Land Mobile Network (PLMN), and/or a second generation (2G) network, a third generation (3G) network, a fourth generation (4G) network, a fifth generation (5G) network, and/or another network (e.g., a long term evolution (LTE) network). Additionally, or alternatively, network 180 may include a wide area network (WAN), a metropolitan area network (MAN), a telephone network (e.g., the Public Switched Telephone Network (PSTN)), an ad hoc network, an intranet, the Internet, and/or a combination of these or other types of networks.

Figure 2:
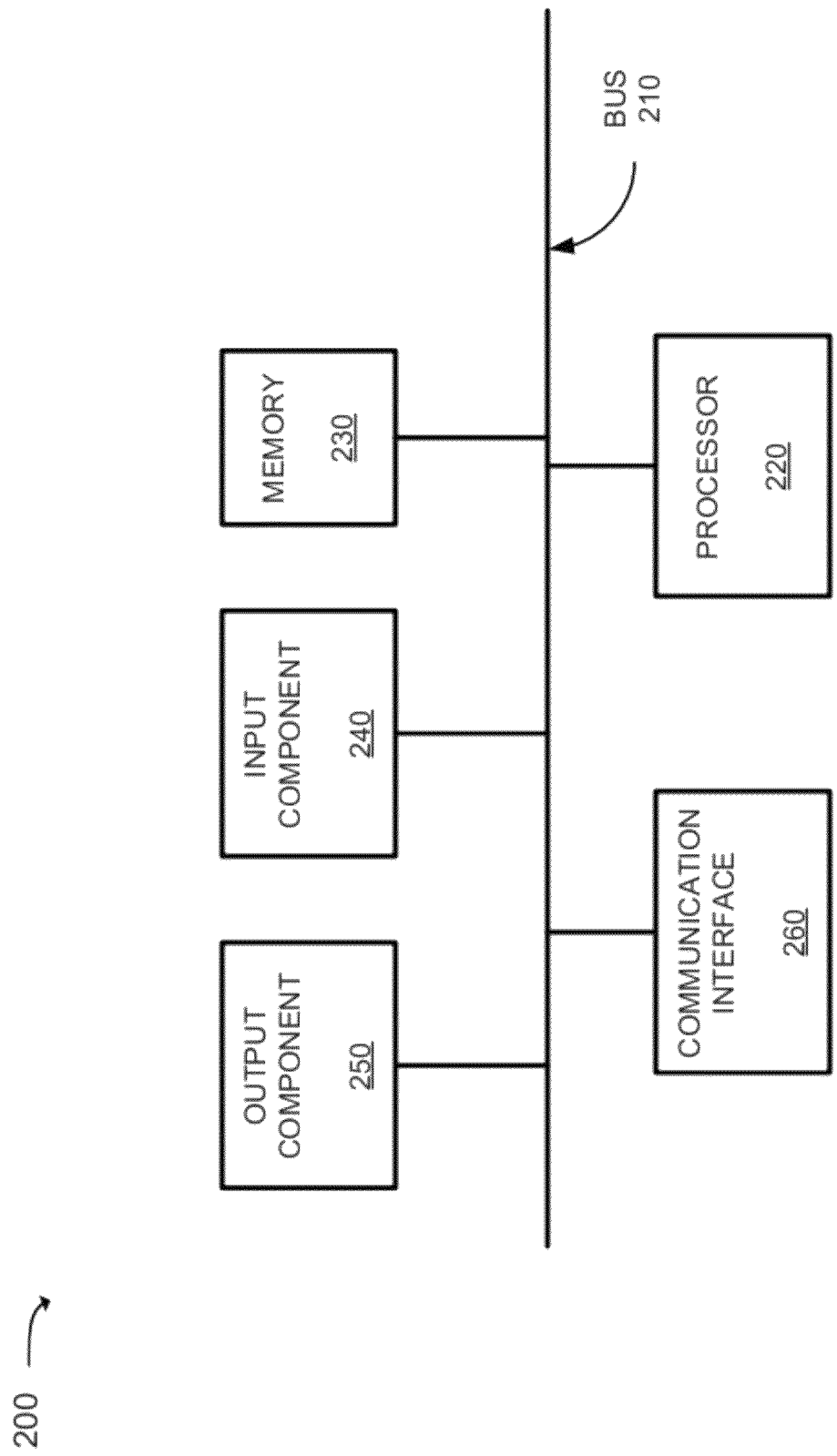
FIG. 2 is a diagram of example components of a device of FIG. 1.

FIG. 2 is a diagram of example components of a device 200 that may correspond to ETV system 115, content delivery system 155, video client 160, video display device 165, and/or application server 175. Each of ETV system 115, content delivery system 155, video client 160, video display device 165, and/or application server 175 may include one or more devices 200. Device 200 may include a bus 210, a processor 220, a memory 230, an input component 240, an output component 250, and a communication interface 260. In another implementation, device 200 may include additional components, fewer components, different components, or differently arranged components than are shown in FIG. 2.

Bus 210 may include a path that permits communication among the components of device 200. Processor 220 may include a processor, microprocessor, or processing logic that may interpret and execute instructions. Memory 230 may include any type of dynamic storage device that may store information and instructions for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems. For example, communication interface 260 may include an Ethernet interface, an optical interface, a coaxial interface, or the like.

As will be described in detail below, device 200 may perform certain operations relating to automated query generation for television content searching. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause to processor 220 to perform processes described herein. Alternatively, hardwired circuitry may be used in place of or in combination with software instructions to implement processes described herein. Thus, implementations described herein are not limited to any specific combination of hardware circuitry and software.

The software instructions may be read into memory 230 from another computer-readable medium or from another device via communication interface 260. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Figure 3:
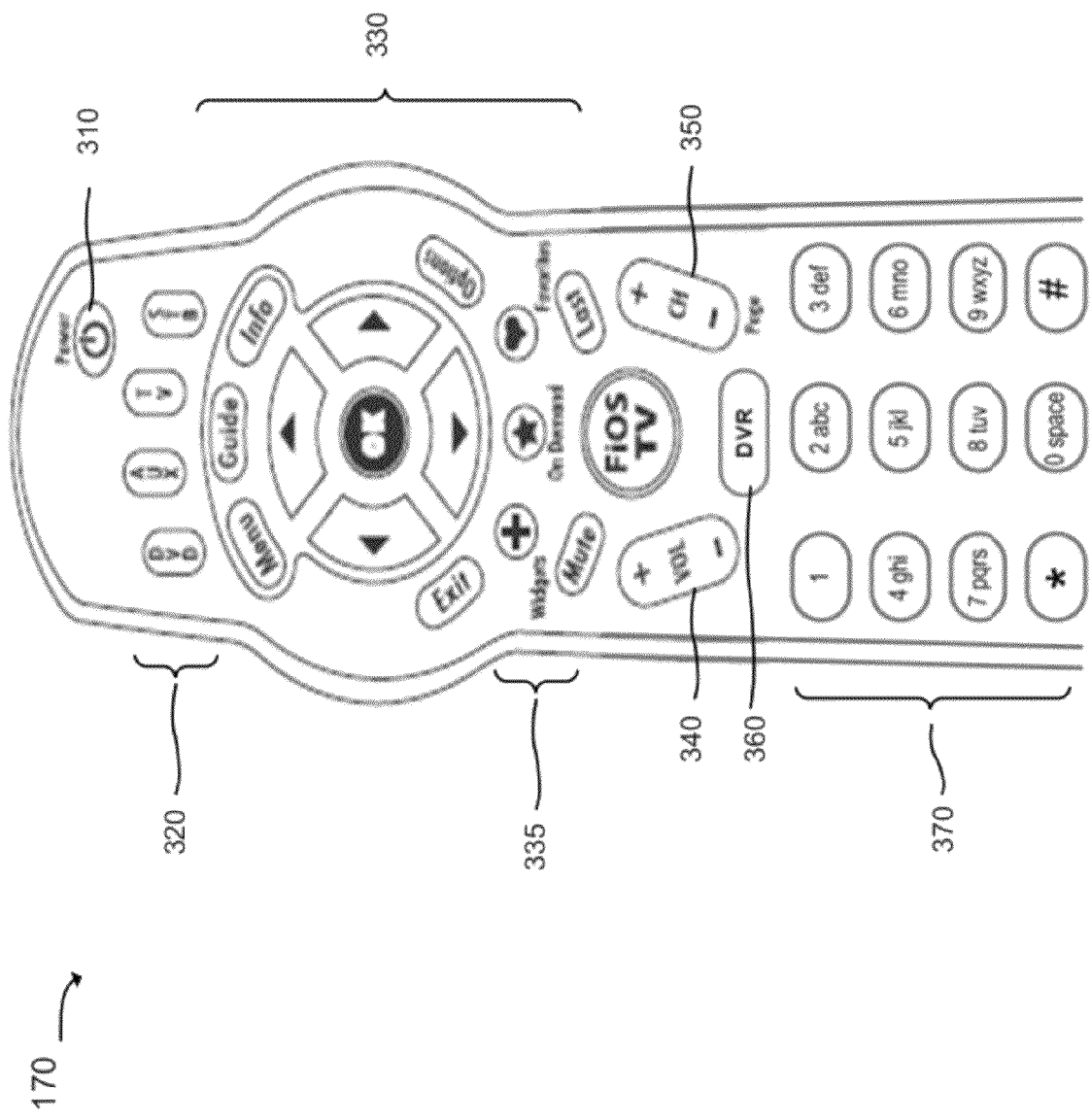
FIG. 3 is a diagram of an example portion of the remote control device of FIG. 1.

FIG. 3 is a diagram of an example portion of remote control 170. As shown in FIG. 3, remote control 170 may include buttons 310-370 that may cause video client 160 and/or video display device 165 to perform various functions. For example, remote control 170 may include a power button 310, device selection buttons 320, interactive content buttons 330, features button 335, volume button 340, channel button 350, DVR button 360, and alphanumeric buttons 370.

Power button 310 may cause a controlled device (e.g., video client 160, video display device 165, or another device, such as a receiver, a VCR, or a DVR player) to power up or down. Device selection buttons 320 may identify a device to be controlled, such as video client 160, video display device 165, or another device, such as a receiver, a VCR, or a DVR player.

Interactive content buttons 330 may include buttons for displaying and interacting with television content. For example, one or more of buttons 330 may be used to navigate (e.g., control a cursor, etc.) via an automatic search UI displayed by video display device 165. Features buttons 335 may include buttons for activating features associated with video client 160. For example, features buttons 335 may include a widgets button (e.g., shown as "✚"), an on demand button (e.g., shown as "★"), a favorites button (e.g., shown as a "♥") and/or other buttons that permit a user to display television content that has been saved by the user as favorite television content; initiate an automated query generation operation; view video on demand (VoD) television content, etc. Volume button 340 may cause a controlled device to change its volume setting. Channel button 350 may cause a controlled device to change a channel setting. DVR button 360 may cause a DVR program schedule to be displayed that may include information associated with television content that the user has selected for recording, play back, etc. Alphanumeric buttons 370 may permit a user to select items listed by alpha numeric characters in a user interface (e.g., displayed by display device 165), to enter characters (e.g., numbers, letters, symbols, etc.) into a user interface, etc.

While FIG. 3 illustrates example buttons of remote control 170, in another implementation, a different type of remote control device may be used to cause video client 160 and/or video display device 165 to perform various functions associated with automatic query generation for television content searching. In another implementation, a user may control video client 160 and/or video display device 165 by pressing certain buttons on one or both devices (e.g., video client 160 and/or video display device 165) and/or another communication or control device. In yet another implementation, a computer, a cellular/mobile phone, a personal digital assistant (PDA) and/or another device capable of wireless communications (e.g., infrared, Bluetooth and/or other wireless capabilities) may control video client 160 and/or video display device 165.

FIG. 4 is a diagram of example functional components 400 associated with video client 160 and/or application server 175. As illustrated, functional components 400 may include a key word generator 410, a popularity-based module 420, a location-based module 430, a time-based module 440, and a user-based module 450. The number of functional components, illustrated in FIG. 4, is provided for explanatory purposes only. In practice, there may be additional functional components, fewer functional components, different functional components, or differently arranged functional components than illustrated in FIG. 4. Also, the functional components in FIG. 4 may be implemented using one or more of the components of device 200 (FIG. 2), such as processor 220.

Key word generator 410 may identify a list of key words, associated with a partial search term entered by a user of video client 160. For example, the user may enter, via an automated search UI, a partial search term (e.g., one or more characters, such as "b," "ba," etc.) and the search application may use key word generator 410 to identify a list of key words, that correspond to the partial search term, from which one or more key words may be identified for display via an automated search UI.

Popularity-based module 420 may enable television content and/or key words, identified by key word generator 410, to be ranked in order of popularity. For example, the search application may use popularity-based module 420 to order and/or rank (e.g., in descending, ascending, or some other order) the list of key words, based on a relative measure of popularity, that enables the search application to select a portion of the key words for display via an automated search UI. In another example, the search application may use popularity-based module 420 to order and/or rank television content, based on a relative measure of popularity, that corresponds to one or more key words. Popularity-based module 420 may retrieve, from a memory associated with video client 160, context information associated with the list of key words and/or television content that identifies the relative measure of popularity associated with each of the key words and/or the television content. In another example, popularity-based module 420 may communicate with application server 175 and/or content delivery system 155 to obtain the context information. Popularity-based module 420 may use information associated with the relative measure of popularity (e.g., obtained from the context information) to arrange and/or rank the list of key words and/or the list of television content.

Location-based module 430 may enable television content and/or the key words, identified by key word generator 410, to be identified and/or ranked based on location. For example, the search application may use location-based module 430 to identify and/or rank key words and/or television content based on a location associated with video client 160 and/or some other location. In one example, location-based module 430 may identify and/or give priority to particular key words associated with a particular geographic location (e.g., by selecting and/or ranking a key word, such as "Baltimore" over another key word, such as "baseball" when video client 160 is located in or near Baltimore, Md.). In another example, location-based module 430 may identify and/or give priority to particular television content associated with the particular location (e.g., by selecting and/or ranking a Baltimore Orioles baseball game over a Boston Red Sox baseball game when video client 160 is located in or near Baltimore, Md.). Location-based module 430 may use information associated with the location to arrange and/or rank the list of key words and/or television content, which the search application may use to select which key word and/or television content to display via the automated search UI.

Time-based module 440 may enable television content and/or the key words, identified by key word generator 410, to be identified and/or ranked based on a time and/or date, a current time, a time of day, a time of year, a season, a holiday, etc. For example, the search application may use time-based module 440 to identify and/or rank key words and/or television content based on a season, a holiday, and/or time of year (e.g., by assigning a higher priority and/or ranking to a key word and/or television content associated with horror, goblins, etc. within a particular time period associated with Halloween). In another example, the search application may use time-based module 440 to identify and/or rank key words and/or television content based on a time of day (e.g., by assigning a higher priority and/or ranking to a key word and/or television content associated horror, suspense, etc. during evening or night-time hours while assigning a lower priority and/or ranking to children's programs during the evening or night-time hours). In yet another example, the search application may use time-based module 440 to identify and/or rank television content based on a time that the television content is to be broadcast relative to a current time (e.g., by ranking and/or prioritizing television content, that will be broadcast closer in time to the current time, higher than television content, that will be broadcast further in time to the current time).

User-based module 450 may enable television content and/or the key words, identified by key word generator 410, to be identified and/or ranked based on user habits and/or settings, such as parental controls, etc. For example, the search application may use user-based module 430 to identify and/or rank key words and/or television content based on a manner in which the user performed prior searches. For example, if the user enters a partial search term that the user also entered at a prior point in time, then user-based module 450 may rank and/or prioritize key words and/or television content, that were presented and/or selected (e.g., by the user) at the prior point in time, higher than key words and/or television content that was not presented and/or selected at a prior point in time. In another example, user-based module 450 may determine that the user frequently watches and/or performs searches associated with television content that corresponds to a particular genre (e.g., sports). Based on the determination that the user frequently watches and/or performs searches associated with the particular genre, user-based module 450 may prioritize and/or rank the key words and/or television content associated with the particular genre higher than key words and/or television content that is not associated with the particular genre. In yet another example, user-based module 450 may not select and/or may not give priority to particular key words and/or television content associated with subject matter, ratings, and/or genre that are specified by the user and/or are prohibited from being displayed based on parental controls and/or user settings associated with search application.

Figure 5A:
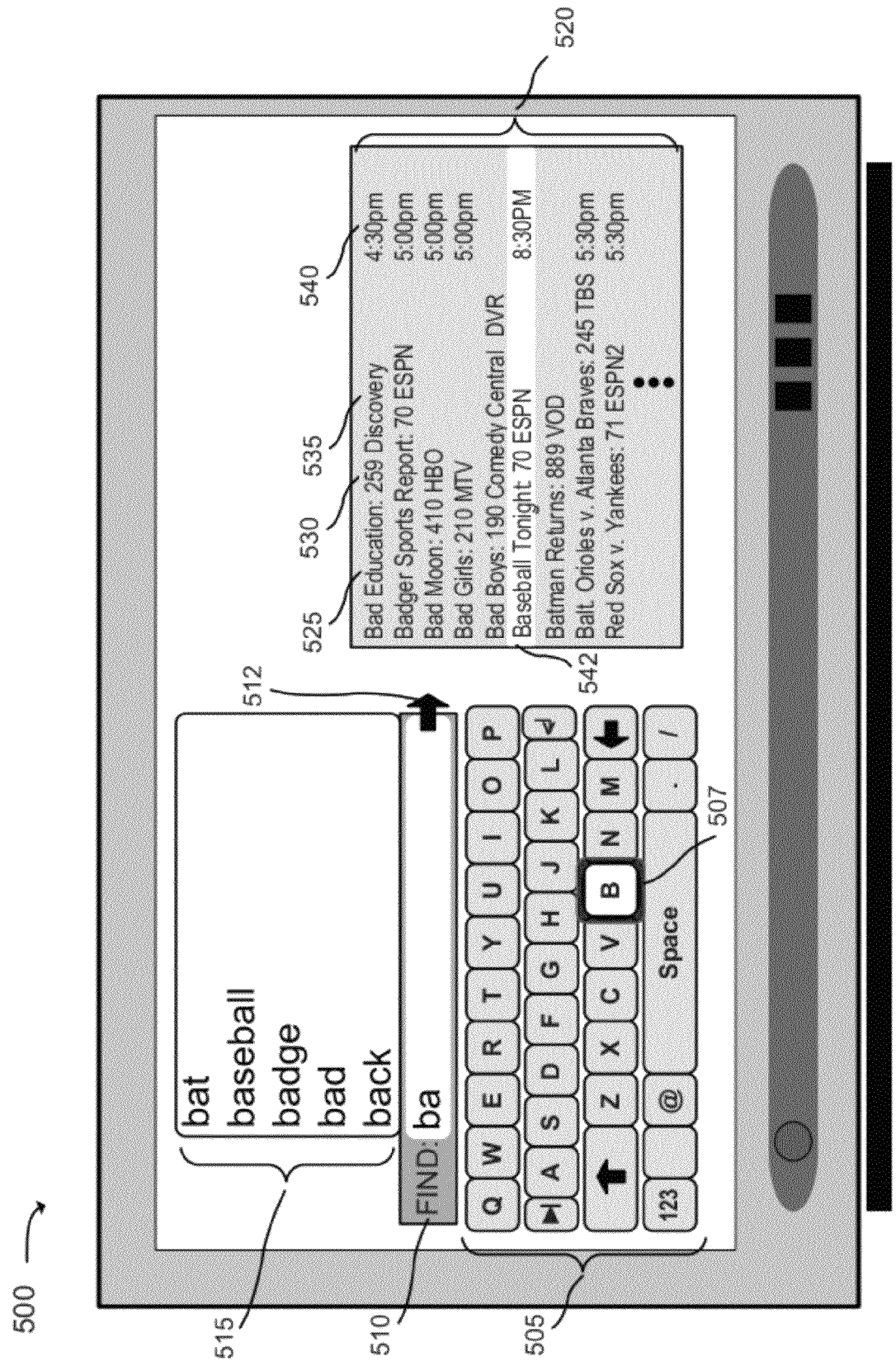
FIGS. 5A and 5B are diagrams of example automated search interfaces capable of being presented on the video display device of FIG. 1.

FIG. 5A is a diagram of an example automated search UI 500 (hereinafter referred to as search UI 500) capable of being presented on video display device 165. Search UI 500 may be presented, by the search application, for display on video display device 165 in response to a request, from a user of video client 160, to perform an automated search query. As illustrated in FIG. 5A, search UI 500 may include a collection of fields and/or data items such as keyboard data item 505, a search field 510 (e.g., shown as "find:"), a suggested key word field 515, an arrow data item 512, a television content field 520, a title field 525, a channel number field 530, a channel name field 535, a time field 540 and a highlight bar data item 542. Search UI 500, of FIG. 5A, includes fields and/or data items 505-542 for explanatory purposes. In practice, search UI 500 may include additional fields and/or data items, fewer fields and/or data items, different fields and/or data items, and/or differently arranged fields and/or data items than are described with respect to search UI 500.

Keyboard data item 505 may include a keyboard that permits a user to create a partial search term, by selecting one or more keys (e.g., Q, W, E, R, etc.) associated with keyboard data item 505. For example, the user may use directional keys 330, on remote control 170, to move and/or scroll highlight data item 507 to one or more keys within keyboard data item 505. The user may use highlight data item 507 to select a letter (e.g., by pressing a particular button on remote control 170) to be included in the partial search term that corresponds with a key over which highlight data item 507 is located. Search field 510 may permit the user to enter the partial search term. For example, the user may enter, into search field 510, a partial search term by selecting letters using keyboard data item 505 and/or highlight data item 507. In another example, the user may enter the partial search term by selecting one or more alpha numeric buttons 370, on remote control 170, that correspond to the partial search term. Arrow data item 512 may identify a partial search term on which television content (e.g., identified in television content field 520) is based.

Suggested key word field 515 may include one or more key words that correspond to the partial search term entered into search field 510. For example, the search application may receive the partial search term (e.g., via search field 510) and may perform an operation to identify a list of key words that are associated with the partial search term. The search application may, in a manner similar to that described above (e.g., with respect to FIG. 4), rank and/or sort the list of key words based on popularity, location, time, user habits, etc. The search application may select a quantity of key words (e.g., one, two, five, ten, etc.) from the ranked list of key words for display via suggested key word field 515.

Television content field 520 may include a list of television content data that corresponds to the partial search term. For example, the search application may retrieve, from a memory associated with video client 160, a list of television content data items and/or identifiers (e.g., associated with broadcast television programs, VoD assets, movies from pay channels, pay per view assets, games, etc.) that corresponds to the partial search term. The search application may, in a manner similar to that described above (e.g., with respect to FIG. 4), rank and/or sort the list of television content data items based on popularity, location, time, user habits, etc. The search application may select a quantity of the television content data items (e.g., one, five, ten, twenty, etc.) from the ranked list of television content for display via television content field 520.

Title field 525 may include a name associated with a particular television content data item within the list of television content within television content field 520. Channel number field 530 may include information associated with a channel via which television content, associated with the particular television content data item, may be broadcast and/or viewed. In one example, channel number field 530 may identify a channel identifier. In another example, channel number field 530 may identify a folder and/or logical location where information, associated with the particular television content data item, may be retrieved (e.g., DVR folder) in order to perform an operation on the particular television content (e.g., to play, record, etc.). Channel name field 535 may include an identifier that corresponds to the channel via which television content, associated with the particular television content data item, may be broadcast and/or viewed. Time field 540 may identify a programming time at which the television content associated with the particular television content data item is to be broadcast and/or is scheduled to be played.

Highlight bar data item 542 may be used to select the particular television content in order to perform the operation on the selected television content. For example, the user may move and/or scroll highlight bar data item 542 up or down through the ranked and/or sorted list of television content data items and may select the particular television content data item over which highlight bar data item 542 is located. By selecting the particular television content data item, the search application may enable the user to perform the operation on television content that corresponds to the selected television content data item.

The user may enter a partial search term (e.g., shown as "ba" in search field 510) and the search application may use the partial search term to retrieve, from a memory associated with video client 160, a list of key words that correspond to the partial search term. The search application may prioritize and/or rank each of the key words based on a measure of popularity associated with each key word (e.g., obtained from the context information associated with each of the key words). The popularity of a key word may, for example, be based on a quantity of times that the key word has been used as a search term by other video clients 160 and/or a quantity of times that the key word has been used as a search term by video client 160. In another example, a key word may be given priority based on a time of year (e.g., "baseball" may be more popular than "basketball" in the summer time), a time of day (e.g., bats and/or Batman may be given higher priority during nighttime hours than during day time hours), etc. In yet another example, the key word may be given priority based on a geographic location associated with video client 160 (e.g., baseball and/or Baltimore, Md. may be more popular than "bad" or "badge" when video client 160 is located near Baltimore, Md., etc.). Based on the relative priority and/or rank of each of the key words, the search application may select, from the list of key words, a quantity of key words, which are prioritized and/or ranked higher than other key words, for display (e.g., via suggested key word field 515).

Based on the partial search term (e.g., entered into search field 510), the search application may retrieve, from the memory, a list of television content data items that correspond to the partial search term. The search application may, in a manner similar to that described above, prioritize and/or rank the television content data times based on a relative popularity associated with each of the television content data items based on context information associated with each of the television content data items. The popularity may, for example, be based on a quantity of times each of the television content data items has been selected by other video clients 160 and/or a quantity of times the each of the television content data items has been selected by video client 160. In another example, the particular television content may be given a priority and/or ranking based on a time of a broadcast relative to a current time (e.g., television content to be broadcast closer in time to a current time may be ranked higher than television content to be broadcast further in time to the current time); a time of year (e.g., "Batman" may be given higher priority in October and/or on Halloween than in July); a time of day (e.g., Batman may be given higher priority during nighttime hours than during daytime hours); etc. In yet another example, the priority and/or ranking may be based on a location associated with video client 160 (e.g., a Baltimore Orioles baseball game may be prioritized and/or ranked higher than a Boston Red Sox baseball game when video client 160 is located near Baltimore, Md., etc.). Based on the priority and/or ranking of each of the television content data items, the search application may select a quantity of the television content data items, for display (e.g., via suggested television content field 520).

Figure 5B:
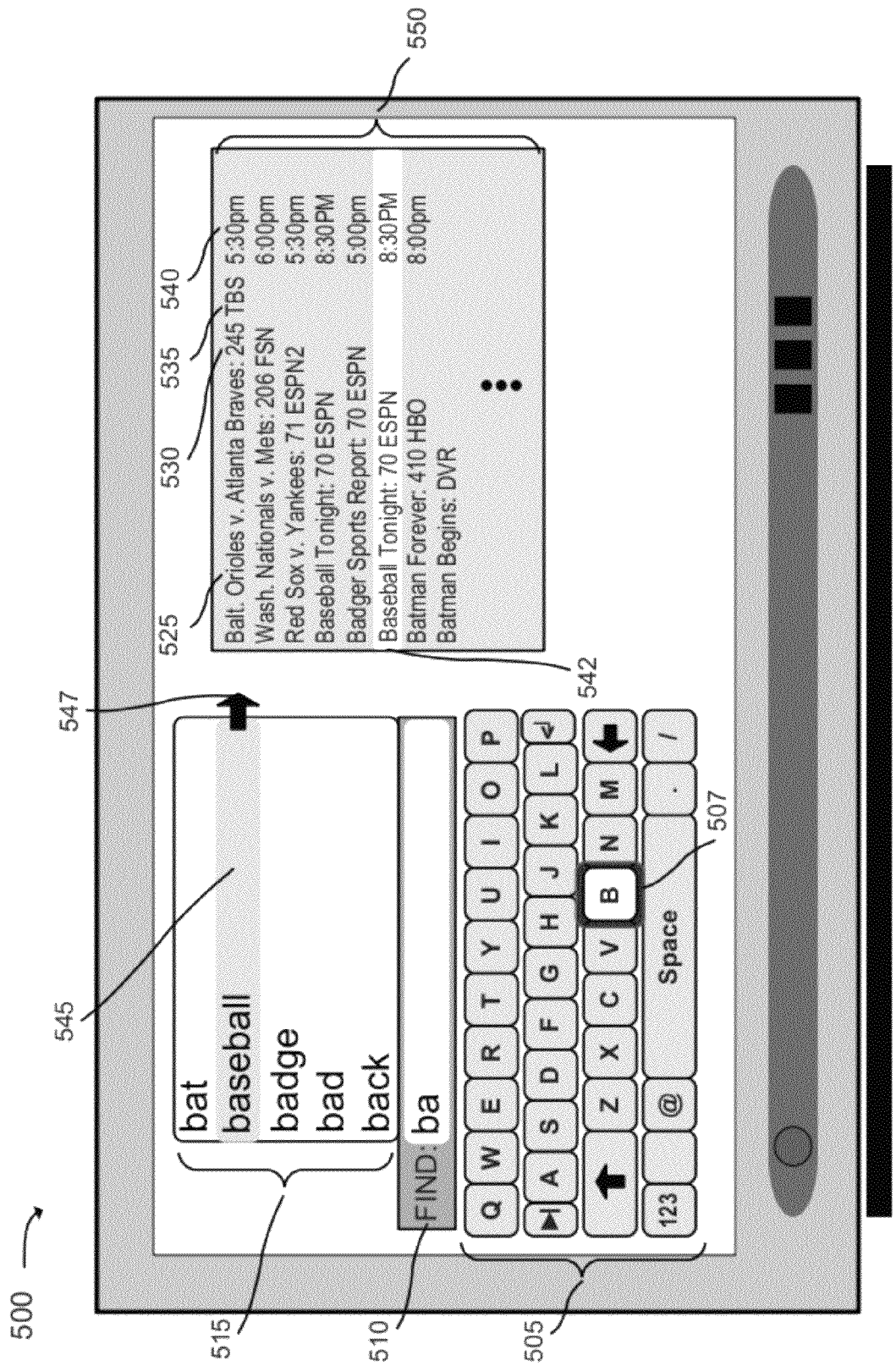

FIG. 5B is a diagram of an example search UI 500 that is displayed on video display device 165. Search UI 500 may include fields and/or data items 505-542 as described above with respect to FIG. 5A and may include a highlight bar data item 545, an arrow data item 547, and a selected television content field 550.

Highlight bar data item 545 may be used to select a key word that is included within key word field 515. For example, the user may move and/or scroll highlight bar data item 545 up or down through the key words displayed in key word field 515. The user may select a particular key word over which highlight bar data item 545 is located. By selecting the particular key word, the search application may perform an operation to identify television content that corresponds to the selected key word. Arrow data item 547 may identify a key word on which retrieved television content (e.g., identified in selected television content field 550) is based.

Selected television content field 550 may include a list of television content that corresponds to the selected key word. For example, the search application may retrieve, from a memory associated with video client 160, a list of television content data items that corresponds to the selected key word. The search application may, in a manner similar to that described above (e.g., with respect to FIG. 4), rank and/or sort the list of television content data items based on popularity, location, time, user habits, etc. The search application may select a quantity of the television content data items (e.g., one, five, ten, twenty, etc.) from the ranked list of television content data items for display via selected television content field 550. The user may use highlight bar data item 542 to move and/or scroll through the ranked and/or ordered list of television content data items and may select a particular television content data item over which highlight bar 542 is located. By selecting the particular television content data item, the user may instruct the search application to perform the operation on television content that corresponds to the selected television content data item.

For example, the user may use highlight bar 545 to select a particular key word (e.g., shown as "baseball" in suggested key word field 515). The search application may, based on the selection, retrieve a list of television content data items that correspond to the selected key word. The search application may, in a manner similar to that described above (e.g., with respect to FIG. 5A), determine a priority and/or ranking associated with each of the television content data items based on context information (e.g., that includes information associated with popularity, time, location, prior usage, etc.) associated with each of the television content data items. Based on the priority and/or ranking of each of the television content data items, the search application may select a quantity of the television content data items, that are prioritized and/or ranked higher than other television content data items, for display (e.g., via selected television content field 550).

FIG. 6 is a flowchart of an example process 600 for interacting with and using automated search functions according to an implementation described herein. In one example implementation, some or all of process 600 may be performed by video client 160, video display device 165 and/or other example portions of environment 100. In another implementation, some or all of process 600 may be performed by one or more devices separate from, or in combination with, video client 160.

As shown in FIG. 6, process 600 may include receiving a request to perform a search and presenting a search UI for display in response to the request (block 605). For example, a user of video client 160 may send, to video client 160, a request to perform a search for television content. The request may be sent when the user presses a particular button on remote control 170 (e.g., one or more of features button 335 or some other button or series of buttons). A search application, hosted by video client 160, may receive the request and may retrieve, from a memory associated with video client 160, information associated with a search UI (e.g., search UI 500 of FIG. 5A).

As also shown in FIG. 6, process 600 may include receiving, via the search UI, a partial search term (block 610) and retrieving key words associated with the key words (block 615). For example, the user may enter one or more alpha numeric characters associated with a partial search term into the search UI (e.g., by using a keyboard associated with the search UI and/or by pressing a button or series of buttons on remote control 170). The search application may receive the partial search term via the search UI and may retrieve, from the memory, a list of key words associated with the partial search term. In another example implementation, the search application may communicate with another server device (e.g., application server 175 and/or content delivery system 155) to obtain the list of key words associated with the partial search term.

As further shown in FIG. 6, process 600 may include ranking the key words based on context information associated with the key words and presenting the ranked key words for display (block 620). For example, the search application may retrieve, from the memory, context information associated with each of the list of key words. The context information may include information associated with a measure of popularity, location information, time information and/or user information associated with each key word. The information associated with the measure of popularity may include a quantity of times a key word has been used to perform a search by video client 160 and/or other video clients 160, a quantity of times the key word has been selected from key word lists, a quantity of search results obtained while using the key word to perform a search on the Internet, and/or a popularity ranking of the key word based on a popularity list obtained from a network (e.g., the Internet), etc.

The location information may include information that associates the key word to a particular geographic location, area, etc. (e.g., a key word, such as "Steelers" may be associated with Pennsylvania, Pittsburgh, etc.). The time information may include information that associates the key word to a particular time period, such as a time of day (e.g., morning, afternoon, evening, a specific time, such as 12:30 μm, etc.), a day of the week (e.g., Monday, Tuesday, etc.), a season (e.g., winter, spring, summer, fall, holiday season, etc.), a holiday (e.g., Halloween, Thanksgiving, Christmas, etc.), a time of year (e.g., January, February, etc.), a specific date (e.g., Apr. 12, 2011, etc.), etc.

The user information may include a quantity of times the key word is used by a user, of video client 160, to perform a search, and/or a quantity of times that the user has selected the key word from a list of key words. The user information may also, or alternatively, include information associated with user preferences (e.g., genres, television content, ratings, parental controls, etc.) and/or key words used by the user and/or associated with user preferences (which may be stored in a user profile).

The search application may use the context information to rank and/or prioritize the list of key words based on the measure of popularity, the location information, the time information, the user information, and/or a combination thereof. For example, the search application may rank and/or prioritize the list of key words based on the information associated with the measure of popularity that corresponds to each key word. The search application may assign, to a key word, a rank and/or priority that corresponds to a measure of popularity of the key word. For example, the assigned rank and/or priority may be higher than another rank and/or priority, assigned to another key word, based on a determination that the measure of popularity is greater than another measure of popularity that corresponds to the other key word. Based on the assigned rank and/or priority, the search application may assign a popularity score (e.g., Sp) to the key word.

In another example, the search application may rank and/or prioritize the list of key words based on the location information associated with each key word. For example, the search application may assign, to a key word, a rank and/or priority that corresponds to a distance between a location associated with video client 160 and another location associated with the key word. The assigned rank and/or priority may be higher than another rank and/or priority, assigned to another key word, based on a determination that the distance associated with the key word is less than another distance associated with the other key word. Based on the assigned rank and/or priority, the search application may assign a location score (e.g., $S_L$) to the key word.

In yet another example, the search application may rank and/or prioritize the list of key words based on the time information associated with each key word. For example, the search application may assign, to a key word, a rank and/or priority that corresponds to a time difference between a current time and a time associated with the key word. The assigned rank and/or priority may be higher than another rank and/or priority, assigned to another key word, based on a determination that the time difference associated with the key word is less than another time difference associated with the other key word. Based on the assigned rank and/or priority, the search application may assign a time score (e.g., $S_T$) to the key word.

In still another example, the search application may rank and/or prioritize the list of key words based on the user information associated with each key word. For example, the search application may assign, to a key word, a rank and/or priority based on whether the key word is associated with user preferences, a quantity of times the user has used the key word to perform a search, etc. The assigned rank and/or priority may be higher than another rank and/or priority, assigned to another key word, based on a determination that the other key word is not associated with the user preferences and/or the quantity of times the user has used the key word is greater than another quantity of times that the user has selected the other key word. Based on the assigned rank and/or priority, the search application may assign a user score (e.g., $S_U$) to the key word.

In a further example, the search application may rank and/or prioritize the list of key words based on a combination of one or more of the information associated with the measure of popularity, the location information, the time information, and/or the user information. In one example, the search application may generate a total score for each of the key words based on a respective sum of the popularity score, the location score, the time score, and/or the user score (e.g., $S_{TOTAL} = S_P + S_L + S_T + S_U$) assigned to each of the key words. The search application may prioritize and/or rank the key words based on the total scores associated with the key words.

In another example, the search application may assign a relative weighting value to each of the scores (e.g., $S_P$, $S_L$, $S_T$, and/or $S_U$) that were assigned to each of the key words. In one example, the weighting values may be specified by the user. In another example, the weighting values may be predetermined by the search application. A relative weighting value may be specified with respect to popularity (e.g., $W_P$), to location (e.g., $W_L$), to time (e.g., $W_T$), and/or to user habits and/or preferences (e.g., $W_U$), such that a total score may be determined based on the scores and the weighting factors (e.g., $S_{TOTAL} = W_P * S_P + W_L * S_L + W_T * S_T + W_U * S_U$). Thus, for example, if a user specifies that ranking of key words is to be based a weight value of 0.5 for popularity, a weight value of 0.25 for location, a weight value of 0.0 for time (i.e., time will not be a factor in the ranking determination), and a weight value of 0.25 for user habits and/or preferences, the search application may determine a total score based on the information specified by the user and the scores assigned by the search application (e.g., $S_{TOTAL} = 0.5 * S_P + 0.25 * S_L + 0.0 * S_T + 0.25 * S_U$). The search application may select, from the ranked list of key words, a quantity of key words (e.g., a top 3, 5, 10, etc.), for display via the search UI.

In an example implementation, the search application may use one or more modules (e.g., popularity-based module 420, location-based module 430, time-based module 440, and/or user-based module 450 of FIG. 4) to retrieve all or a portion of the context information, to score each of the key words, and/or to prioritize and/or rank each of the of key words based on the scores.

As yet further shown in FIG. 6, process 600 may include retrieving television content based on the partial search term (block 625). For example, the search application may receive the partial search term via the search UI and may retrieve, from the memory, a list of television content associated with the partial search term. In another example implementation, the search application may communicate with another server device (e.g., application server 175 and/or content provider system 155) to obtain the list of television content associated with the partial search term.

As still further shown in FIG. 6, process 600 may include ranking the television content based on context information associated with the television content and presenting the ranked television content for display (block 630). For example, the search application may retrieve, from a memory associated with video client 160, context information associated with each item of television content within the list of television content. The context information may include information associated with a measure of popularity, location information, time information and/or user information associated with each item of television content within a list of television content. The information associated with the measure of popularity may include a quantity of times an item of television content has been selected (e.g., from a television guide) and/or operated on (e.g., tuned in, recorded, purchased, etc.) by video client 160 and/or other video clients 160, a quantity of times the item of television content has been selected from a list of television content, a quantity of search results associated with the item of television content (e.g., obtained while using a key word to perform a search on the Internet), and/or a popularity ranking of the item of television content based on a popularity list obtained from a network (e.g., the Internet), etc.

The location information may include information that associates an item of television content to a geographic location, area, etc. (e.g., television content, such as an Orioles baseball game may be associated with Maryland, Baltimore, etc.). In another example, the location information may indicate that an item of television content (e.g., the television program "Lost") is more popular in the United States than at another geographic location that is outside of the United States.

The time information may include information that associates an item of television content (e.g., a television content broadcast time, title and/or identifier, description, etc.) to a time of day (e.g., morning, afternoon, evening, a specific time, such as 12:30 μm, etc.), a day of the week (e.g., Monday, Tuesday, etc.), a season (e.g., winter, spring, summer, fall, holiday season, etc.), a holiday (e.g., Halloween, Thanksgiving, Christmas, etc.), a time of year (e.g., January, February, etc.), a specific date (e.g., Apr. 12, 2011, etc.), etc. In another example, the time information may associate a particular genre of television content to a time of day (e.g., television content of the horror genre may be associated with evening hours while children-oriented television may be associated with morning hours, afternoon hours, etc.).

The user information may include a quantity of times an item of television content was selected, "tuned-in," recorded, included on a DVR record list, etc. by video client 160 with which the user is associated. The user information may also, or alternatively, include information associated with user preferences (e.g., genres, television content, ratings, etc.), parental controls specified by the user, etc.

The search application may use the context information to rank and/or prioritize the list of television content based on the measure of popularity, the location information, the time information, the user information, and/or a combination thereof. In one example, the search application may rank and/or prioritize the list of television content based on the information associated with the measure of popularity that corresponds to each item of television content within the list of television content. The search application may assign, to an item of television content, a rank and/or priority that corresponds to a measure of popularity of the item of television content. The assigned rank and/or priority may be higher than another rank and/or priority, assigned to another item of television content, based on a determination that the measure of popularity is greater than another measure of popularity that corresponds to the other item of television content. Based on the assigned rank and/or priority, the search application may assign a popularity score (e.g., $STV_P$) to the item of television content.

In another example, the search application may rank and/or prioritize the list of television content based on the location information associated with each item of television content. For example, the search application may assign, to an item of television content, a rank and/or priority that corresponds to a distance between a location associated with video client 160 and another location associated with the item of television content. The assigned rank and/or priority may be higher than another rank and/or priority, assigned to another item of television content, based on a determination that the distance associated with the item of television content is less than another distance associated with the other item of television. Based on the assigned rank and/or priority, the search application may assign a location score (e.g., $STV_L$) to the item of television content.

In yet another example, the search application may rank and/or prioritize the list of television content based on the time information associated with each item of television content. For example, the search application may assign, to an item of television content, a rank and/or priority that corresponds to a time difference between a current time and a time associated with the television content (e.g., a broadcast time, a time associated with a holiday, etc.). The assigned rank and/or priority may be higher than another rank and/or priority, assigned to another item of television content, based on a determination that the time difference associated with the item of television content is less than another time difference associated with the other item of television content. Based on the assigned rank and/or priority, the search application may assign a time score (e.g., $STV_T$) to the item of television content.

In still another example, the search application may rank and/or prioritize the list of television content based on the user information associated with each item of television content. For example, the search application may assign, to an item of television content, a rank and/or priority based on whether the item of television content is associated with user preferences, a quantity of times that the user has caused an operation to be performed on the item of television content (e.g., tuning in, recording, saving to a DVR list, etc.). The assigned rank and/or priority may be higher than another rank and/or priority, assigned to another item of television content, based on a determination that the other item of television content is not associated with the user preferences and/or the quantity of times that the user has caused the operation to be performed on the item of television content is greater than another quantity of times that the user has caused an operation to be performed on another item of television content. Based on the assigned rank and/or priority, the search application may assign a user score (e.g., $STV_U$) to the item of television content.

In a further example, the search application may, in a manner similar to that described above, rank and/or prioritize the list of television content based on the information associated with the measure of popularity, the location information, the time information, and/or the user information. In one example, the search application may generate a total score for each of the items of television content based on a respective sum of the popularity score, the location score, the time score, and/or the user score (e.g., $STV_{TOTAL}=STV_P+STV_L+STV_T+STV_U$) assigned to each of the items of television content. The search application may prioritize and/or rank the items of television content based on the total scores associated with the items of television content.

In another example, the search application may assign a relative weighting value to each of the scores (e.g., $STV_P$, $STV_L$, $STV_T$, and/or $STV_U$) that were assigned to each of the items of television content. In one example, the weighting values may be specified by the user.

In another example, the weighting factor may be predetermined by the search application. A relative weighting value may be specified with respect to popularity (e.g., $WTV_P$), to location (e.g., $WTV_L$), to time (e.g., $WTV_T$), and/or to user habits and/or preferences (e.g., $WTV_U$), such that a total score may be determined (e.g., $STV_{TOTAL}=WTV_P*STV_P+WTV_L*STV_L+WTV_T*STV_T+WTV_U*STV_U$). Thus, for example, if the user specifies weight values on which the television content is to be ranked (e.g., a weight value of 0.15 for popularity, a weight value of 0.5 for user habits and/or preferences, a weight value of 0.2 for location, and a weight value of 0.15 for time), the search application may determine a total score based on the information specified by the user and the scores assigned by the search application (e.g., $STV_T=0.15*STV_P+0.20*STV_L+0.15*STV_T+0.50*STV_U$).

In an example implementation, the search application may use one or more modules (e.g., popularity-based module 420, location-based module 430, time-based module 440, and/or user-based module 450 of FIG. 4) to retrieve all or a portion of the context information, to score each of the items of television content, and/or to prioritize and/or rank each of the of items of television content based on the scores.

The context information may, in a manner similar to that described above in relation to context information associated with the list of key words (e.g., as described above with respect to block 620), include information associated with a measure of popularity, location information, time information, and/or user information associated with television content. The information associated with the measure of popularity may include a quantity of times that an item of television content has been selected from a list of television content (e.g., a television guide), a quantity of times an operation has been performed on an item of television content (e.g., by video client 160 and/or other video clients 160), and/or a popularity ranking of the television content based on a popularity list obtained from a network (e.g., the Internet), etc.

The location information may include information that associates the television content to a particular geographic location, area, etc. (e.g., an item of television content, such as a Bills football game may be associated with New York, Buffalo, etc.). The time information may include information that associates an item of television content, that is already matched to a broadcast time, to a particular time period, such as a time of day (e.g., morning, afternoon, evening, a specific time, such as 12:30 μm, etc.), a day of the week (e.g., Monday, Tuesday, etc.), a season (e.g., winter, spring, summer, fall, holiday season, etc.), a holiday (e.g., Halloween, Thanksgiving, Christmas, etc.), a time of year (e.g., January, February, etc.), a specific date (e.g., Apr. 12, 2011, etc.), etc.

The user information may include a quantity of times that the television content has been selected (e.g., from a television guide) by a user of video client 160, a quantity of times that video client 160 has performed an operation on an item of video content (e.g., tuned in, recorded, added to a DVR list, etc.). The user information may also, or alternatively, include information associated with user preferences (e.g., genres, television content, ratings, parental controls, etc.) and/or favorite items of television content used by the user and/or associated with user preferences (which may be stored in a user profile).

In one example implementation, the search application may use one or more modules (e.g., popularity-based module 420, location-based module 430, time-based module 440, and/or user-based module 450 of FIG. 4) to retrieve all or a portion of the context information and/or to rank and/or prioritize the list of television content, in a manner similar to that described above, based on the retrieved context information.

As also shown in FIG. 6, if selection of television content is received (block 635—YES), then process 600 may include retrieving information associated with the selected television content and performing an act on the information associated with the selected television content (block 640). For example, the user may review the list of television content, displayed via the search UI, and may select an item of television content on which to perform an operation. The search application may receive the selection of the item of television content and may retrieve information associated with the selected item of television content that permits the user to perform the operation. The operation may include tuning in and/or receiving the selected television content (e.g., on a particular channel, etc.), presenting the selected television content for display on video display device 165, recording the selected television content (e.g., using a DVR), storing the selected item of television content in a DVR record list, etc.

The search application may update context information associated with the television content, based on the selection of the item of television content and/or the operation performed on the television content. Additionally, or alternatively, the search application may update context information associated with user habits and/or preferences based on the selection of the item of television content. The search application may store the updated context information in the memory associated with video client 160 and/or may send the updated context information to a server device (e.g., content delivery system 155, application server 175, etc.).

As shown in FIG. 6, if selection of television content is not received (block 635—NO), then process 600 may include receiving selection of a key word (block 645) and retrieving television content based on the selection of the key word (block 650). For example, the user may not select the television content, associated with the partial search term, displayed via the search UI. The user may, instead, review the list of key words displayed via the search UI and may select one of the key words with which to perform a search for television content. The search application may receive the selection of the key word and may retrieve, from a memory associated with video client 160, another list of television content based on the selected key word. In another example implementation, the search application may retrieve the other list of television content from a server device (e.g., content delivery system 155, application server 175, etc.).

The search application may, in a manner similar to that described above (e.g., with respect to block 630) retrieve, from the memory, other context information associated with each item of television content within the other list of television content. The search application may use the other context information to rank the items of television content based on the other context information. The search application may select, from the ranked items of television content, a quantity of items of television content (e.g., a top 10, 20, etc.) for display via the search UI.

The user may, in a manner similar to that described above (e.g., with respect to block 640) select one of the items of television content displayed via the search UI on which to perform an operation. The search application may receive the selection of the item of television content and may retrieve information associated with the selected item of television content that permits the user to perform the operation. The search application may update the context information associated with the selected key word and/or the selected item of television content and may save the updated context information in a memory associated with video client 160. In another example implementation, the search application may send the updated context information to a server device (e.g., content delivery system 155 and/or application server 175).

Systems and/or methods, described herein, may enable a user of a video client device to create a query, within a short amount of time, to be used to search for desired television content based on a partial search term that includes fewer than all of the characters of a search term. The systems and/or methods may enable the user to enter a partial search term associated with desired television content. The systems and/or methods may use the partial search term to identify a list of key words from which the user may select a key word to be included in a search query. The list of key words may be ranked and/or displayed based on context information associated with each key word. The systems and/or methods may use the search query to retrieve a list of television content from which the user may select particular television content on which to perform an operation (e.g., play, record, save, tune in, etc.). The list of television content may be ranked and/or displayed based on context information associated with each item of television content. In one implementation, the context information used to rank the key words may differ from the context information used to rank the television content.

The foregoing description provides illustration and description, but is not intended to be exhaustive or to limit the implementations to the precise form disclosed. Modifications and variations are possible in light of the above teachings or may be acquired from practice of the embodiments.

While a series of blocks has been described with regard to FIG. 6, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component or logic that performs one or more functions. A component or logic, as used herein, may include hardware, such as a processor, an ASIC, or a FPGA, or a combination of hardware and software (e.g., a processor executing software).

It should be emphasized that the terms "comprises" and/or "comprising," when used in this specification, are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
receiving, by a video client device, a portion of a key word in a search field of a user interface for performing searches for television content;
automatically performing, by the video client device, a first search, based on the portion of the key word, to identify a first group of television content relating to the portion of the key word;
retrieving, by the video client device, content context information associated with the first group of television content;
ranking, by the video client device and based on the content context information, the first group of television content relating to the portion of the key word;
retrieving, by the video client device and from a memory associated with the video client device, a group of key words matching the portion of the key word without receiving a request to perform a key word search based on the portion of the key word;
retrieving, by the video client device, key word context information associated with a plurality of key words in the group of key words, where the key word context information, for a particular key word of the plurality of key words, indicates a measure of popularity of the particular key word, and geographic location information associated with the particular key word, and time information associated with the particular key word, and user preference information associated with the particular key word;
ranking, by the video client device, the plurality of key words based on the key word context information;
automatically presenting, by the video client device and simultaneously with a display of the ranked first group of television content, one or more of the plurality of key words for display based on the ranking of the plurality of key words;
receiving, by the video client device, selection of a key word from the one or more of the plurality of key words; and
performing, by the video client device, a second search for television content based on the selected key word to identify a second group of television content.

2. The method of claim 1, further comprising:
receiving, by the video client device, selection of television content from the second group of television content; and presenting, by the video client device, the selected television content for display.

3. The method of claim 1, where the measure of popularity, for the particular key word, is based on at least one of:
- a quantity of prior searches, using the particular key word, that were performed by a plurality of video client devices,
- a quantity of prior searches, using the particular key word, that were performed by only the video client device,
- a quantity of search results obtained by performing a search, using the particular key word, on the Internet, or
- a popularity list, available on a network, that lists a plurality of key words based on a measure of popularity.

4. The method of claim 3, where ranking the plurality of key words based on the key word context information includes:
- ranking a first key word, of the plurality of key words, higher than a second key word, of the plurality of key words, where the first key word is:
  - associated with a greater quantity of prior searches, that were performed by the plurality of video client devices, than the second key word,
  - associated with a greater quantity of prior searches, that were performed by the video client device, than the second key word,
  - associated with a greater quantity of search results, for a search performed on the Internet, than the second key word, or
  - listed higher within the popularity list than the second key word.

5. The method of claim 1, where the geographic location information, for the particular key word, includes information, regarding a particular geographic location or area, that was previously associated with the particular key word, and
where ranking the plurality of key words based on the key word context information includes:
- ranking a first key word, of the plurality of key words, higher than a second key word, of the plurality of key words, where the particular geographic location or area, associated with the first key word, is closer, in distance, to a geographic location of the video client device, than the particular geographic location or area, associated with the second key word.

6. The method of claim 1, where the time information, for the particular key word, includes information, regarding a particular time period, that was previously associated with the particular key word, and
where ranking the plurality of key words based on the key word context information includes:
- ranking a first key word, of the plurality of key words, higher than a second key word, of the plurality of key words, where the particular time period, associated with the first key word, is closer, in time, to a current time of the video client device, than the particular time period, associated with the second key word.

7. The method of claim 1, where the user preference information, for the particular key word, is based on at least one of:
- a quantity of times that a user, of the video client device, previously used the particular key word for a search, or
- a quantity of times that the user has previously selected the particular key word from lists of key words, and
where ranking the plurality of key words based on the key word context information includes:
- ranking a first key word, of the plurality of key words, higher than a second key word, of the plurality of key words, where the first key word has been:
  - used a greater quantity of times by the user to perform a search, or
  - selected a greater quantity of times by the user from the lists of key words.

8. The method of claim 1, where the user preference information, for the particular key word, is based on information in a user profile associated with a user of the video client device, and
where ranking the plurality of key words based on the key word context information includes:
- ranking a first key word, of the plurality of key words, higher than a second key word, of the plurality of key words, where the first key word is associated with the information in the user profile and the second key word is not associated with the information in the user profile.

9. The method of claim 1, where the key word context information, for the particular key word, indicates the measure of popularity of the particular key word, the geographic location information associated with the particular key word, the time information associated with the particular key word, and the user preference information associated with the particular key word.

10. The method of claim 1, further comprising:
- permitting a user, of the video client device, to select whether the measure of popularity, the geographic location information, the time information, or the user preference information is used for the key word context information; and
- receiving, from the user, a selection of the measure of popularity, the geographic location information, the time information, or the user preference information for the key word context information.

11. The method of claim 1, where the content context information associated with the first group of television content, for particular television content of the first group of television content, indicates at least two of: a measure of popularity of the particular television content, geographic location information associated with the particular television content, time information associated with the particular television content, or user preference information associated with the particular television content.

12. The method of claim 11, where the content context information is different from the key word context information.

13. A video client device comprising:
- a memory to store context information associated with a plurality of television content; and
- a processor to:
  - receive a portion of a key word in a search field of a user interface for performing searches for television content,
  - automatically retrieve, from the memory, a group of key words, of a plurality of key words, matching the portion of the key word without receiving a request to perform a search based on the portion of the key word,
  - rank, based on first context information associated with each of plurality of the key words, the plurality of key words, where the first context information indicates a measure of popularity of the particular key word, geographic location information associated with the particular key word, time information associated with the particular key word, and user preference information associated with the particular key word, present, via the user interface and simultaneously with search results of television content based on the portion of the key word, one or more of the ranked group of key words for display, receive selection of a key word from the one or more of the ranked group of key words, automatically perform a search for television content based on the selected key word to identify a group of television content of the plurality of television content, rank the group of television content based on second context information associated with the group of television content, present one or more of the group of television content for display based on the ranking of the group of television content, receive selection of television content from the one or more of the group of television content, and present the selected television content for display.

14. The video client device of claim 13, where the measure of popularity, for the particular television content, is based on at least one of:

a quantity of prior selections of the particular television content, from lists of television content, by a plurality of video client devices, a quantity of prior selections of the particular television content, from lists of television content, by only the video client device, a quantity of search results obtained by performing a search, using information regarding the particular television content, on the Internet, or a popularity list, available on a network, that lists a plurality of television content based on a measure of popularity.

15. The video client device of claim 14, where, when ranking the group of television content based on the second context information, the processor is to:

rank a first item of television content, of the group of television content, higher than a second item of television content, of the group of television content, where the first item of television content is:

associated with a greater quantity of prior selections from the lists of television content, by the plurality of video client devices, than the second item of television content, associated with a greater quantity of prior selections from the lists of television content, by only the video client device, than the second item of television content, associated with a greater quantity of search results, for a search performed on the Internet, than the second key word, or listed higher within the popularity list than the second item of television content.

16. The video client device of claim 13, where the geographic location information, for the particular television content, includes information, regarding a particular geographic location or area, that was previously associated with the particular television content, and where, when ranking the group of television content based on the second context information, the processor is to:

rank a first item of television content, of the group of television content, higher than a second item of television content, of the group of television content, where the particular geographic location or area, associated with the first item of television content, is closer, in distance, to a geographic location of the video client device, than the particular geographic location or area, associated with the second item of television content.

17. The video client device of claim 13, where the time information, for the particular item of television content, includes information, regarding a particular time period, that was previously associated with the particular item of television content, and where, when ranking the group of item of television content based on the second context information, the processor is to:

rank a first item of television content, of the group of item of television content, higher than a second item of television content, of the group of item of television content, where the particular time period, associated with the first item of television content, is closer, in time, to a current time of the video client device, than the particular time period, associated with the second item of television content.

18. The video client device of claim 13, where the user preference information, for the particular television content, is based on at least one of:

a quantity of times that a user, of the video client device, previously selected the particular television content from lists of television content, or a quantity of times that the user has previously cause the video client device to play, record, or tune in to the particular television content, and where, when ranking the group of television content based on the second context information, the processor is to:

rank a first item of television content, of the group of television content, higher than a second item of television content, of the group of television content, where the first item of television content has been:

selected a greater quantity of times, by the user, from the lists of television content, than the second item of television content, or played, recorded, or tuned in a greater quantity of times, by the user, than the second item of television content.

19. A non-transitory computer-readable medium containing instruction executable by at least one processor, the computer-readable medium comprising:

one or more instructions to receive a portion of a key word in a search field of a user interface for performing searches for television content;

one or more instructions to automatically perform a first search, based on the portion of the key word, to identify a first group of television content relating to the portion of the key word;

one or more instructions to retrieve content context information associated with the first group of television content;

one or more instructions to rank, based on the content context information, the first group of television content relating to the portion of the key word;

one or more instructions to retrieve a group of key words matching the portion of the key word without receiving a request to perform a key word search based on the portion of the key word;

one or more instructions to retrieve key word context information associated with a plurality of key words in the group of key words, where the key word context information, for a particular key word of the plurality of key words, indicates a measure of popularity of the particular key word, and geographic location information associated with the particular key word, and time information associated with the particular key word, and user preference information associated with the particular key word;

one or more instructions to rank the plurality of key words based on the key word context information;

one or more instructions to automatically and simultaneously present the ranked first group of television content and one or more of the plurality of key words for display based on the ranking of the plurality of key words;

one or more instructions to receive selection of a key word from the one or more of the plurality of key words; and one or more instructions to perform a second search for television content based on the selected key word to identify a second group of television content.

20. The non-transitory computer-readable medium of claim 19, where the key word context information is different than the content context information.

21. The non-transitory computer-readable medium of claim 19, where the content context information includes the user preference information, where the user preference information, for the particular television content, is based on information in a user profile associated with a user, and where the one or more instructions to rank the group of television content based on the content context information includes:

one or more instructions to rank a first item of television content, of the group of television content, higher than a second item of television content, of the group of television content, where the first item of television content is associated with a genre of television content that is identified in the user profile and the second item of television content is not associated with the genre of television content that is identified in the user profile.

22. The non-transitory computer-readable medium of claim 21, where the one or more instruction to rank the group of television content based on the content context information includes:

one or more instructions to rank a first item of television content, of the group of television content, higher than a second item of television content, of the group of television content, where the first item of television content is associated with the information in the user profile and the second item of television content is not associated with the information in the user profile.

23. The non-transitory computer-readable medium of claim 19, where the content context information, for the particular television content, indicates the measure of popularity of the particular item of television content, the geographic location information associated with the particular item of television content, the time information associated with the particular item of television content, and the user preference information associated with the particular item of television content.

24. The non-transitory computer-readable medium of claim 19, where the one or more instruction to rank the group of television content based on the content context information includes:

one or more instructions to rank a first item of television content, of the group of television content, higher than a second item of television content, of the group of television content, where the first item of television content is associated with a price that is less than another price associated with the second item of television content.

* * * * *